(No Model.) 7 Sheets—Sheet 1.
S. FIRTH.
APPARATUS FOR CHECKING AND RECORDING CASH RECEIVED.
No. 370,692. Patented Sept. 27, 1887.
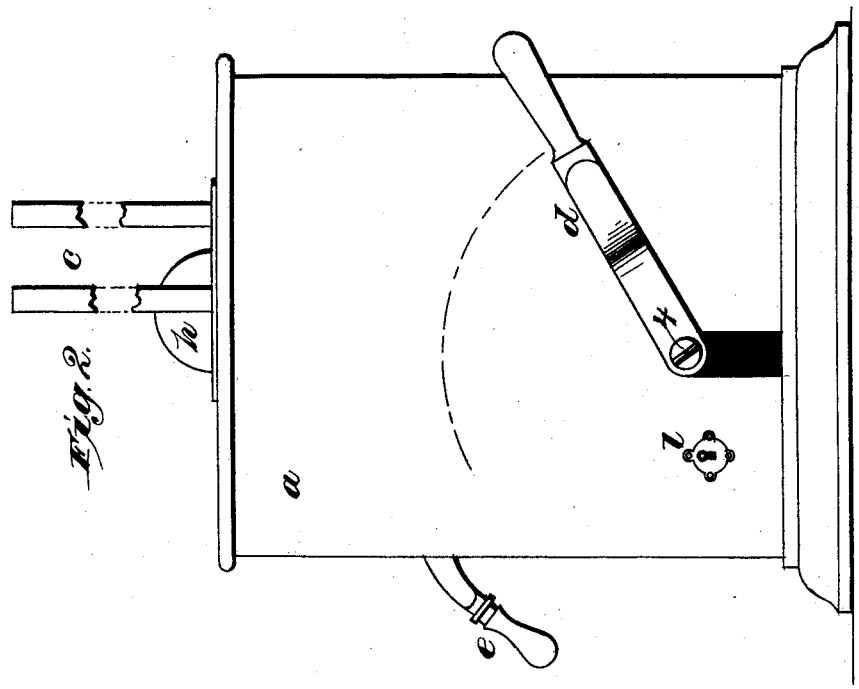
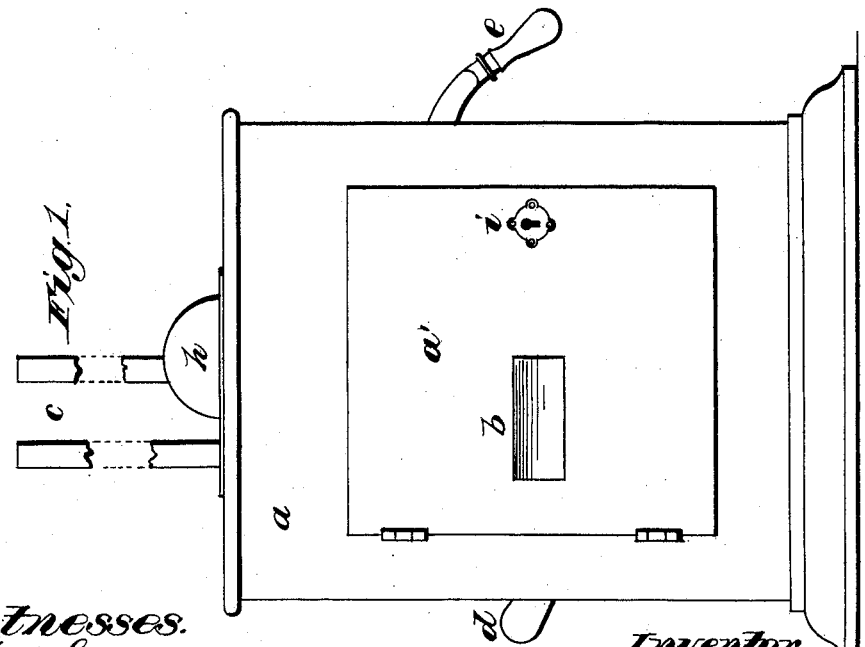
Witnesses.
Inventor.
Sidney Firth,
By James L. Norris,
Atty

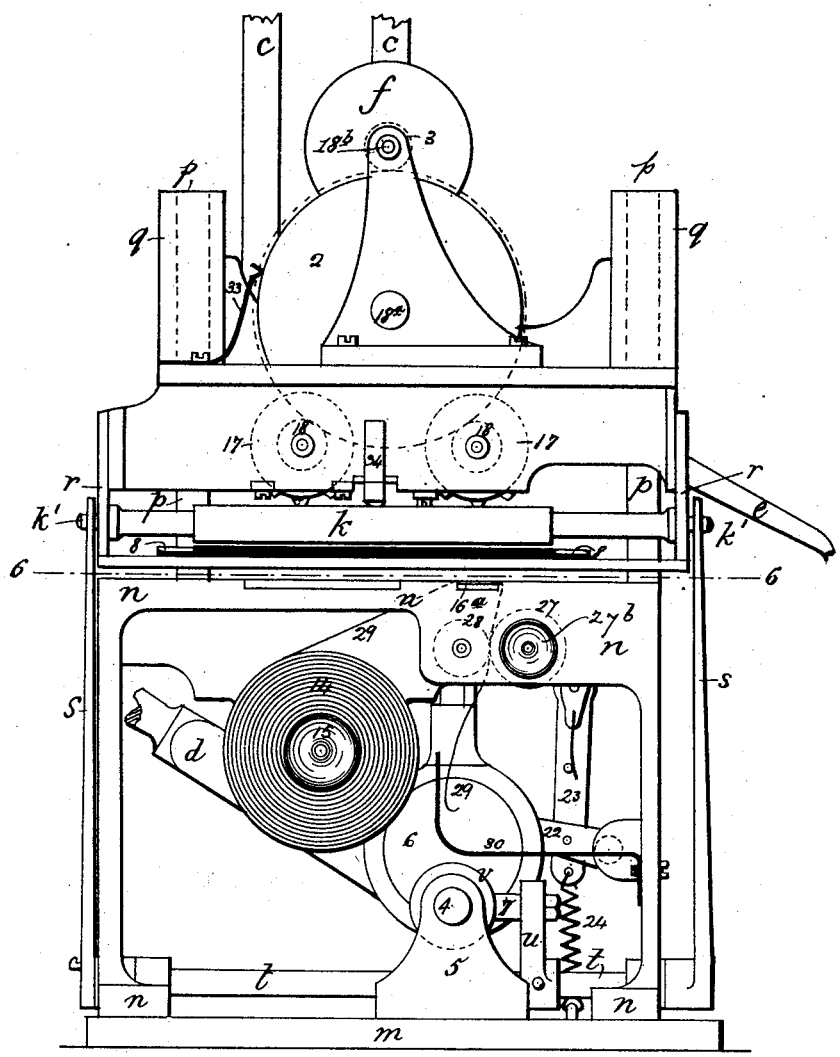

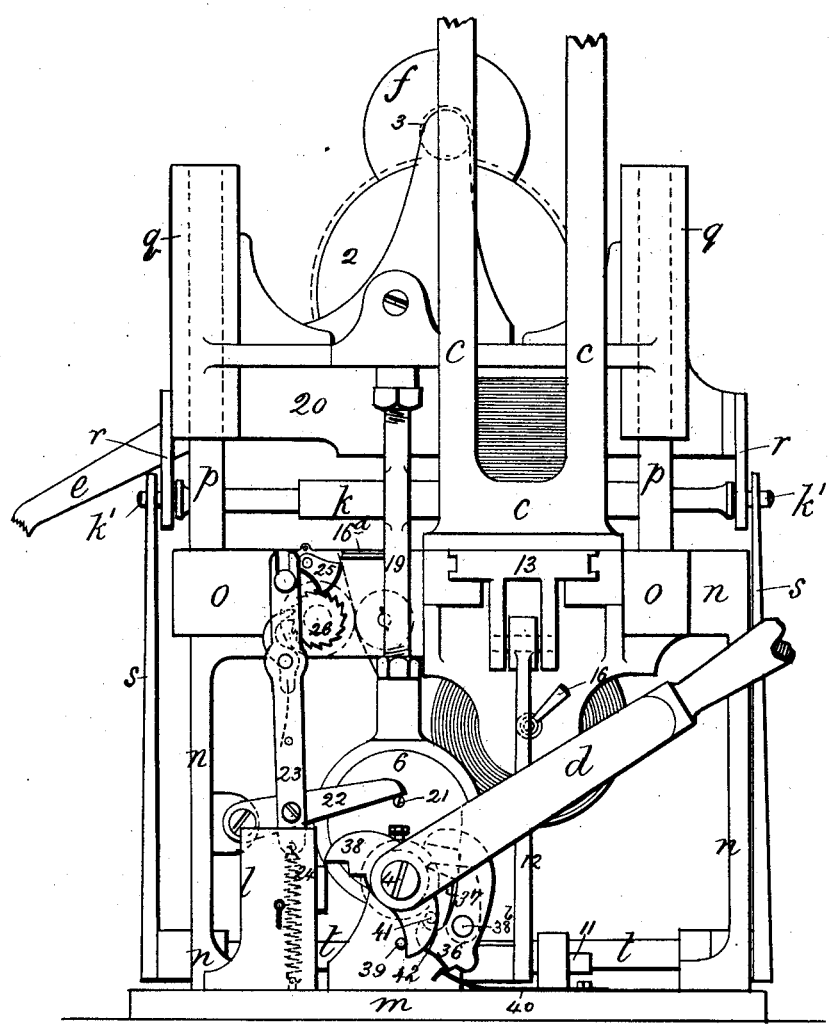

(No Model.) 7 Sheets—Sheet 4.
S. FIRTH.
APPARATUS FOR CHECKING AND RECORDING CASH RECEIVED.
No. 370,692. Patented Sept. 27, 1887.
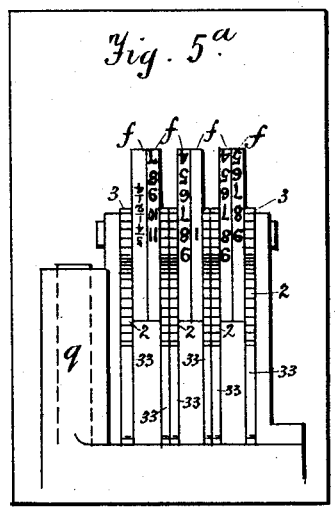
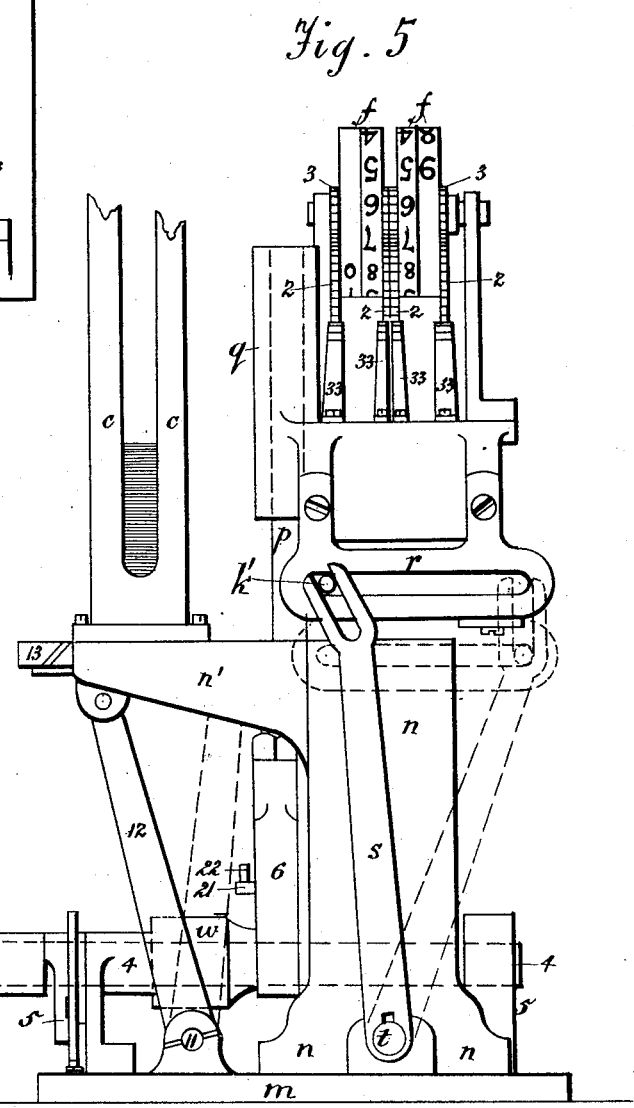

(No Model.) 7 Sheets—Sheet 5.
S. FIRTH.
APPARATUS FOR CHECKING AND RECORDING CASH RECEIVED.
No. 370,692. Patented Sept. 27, 1887.
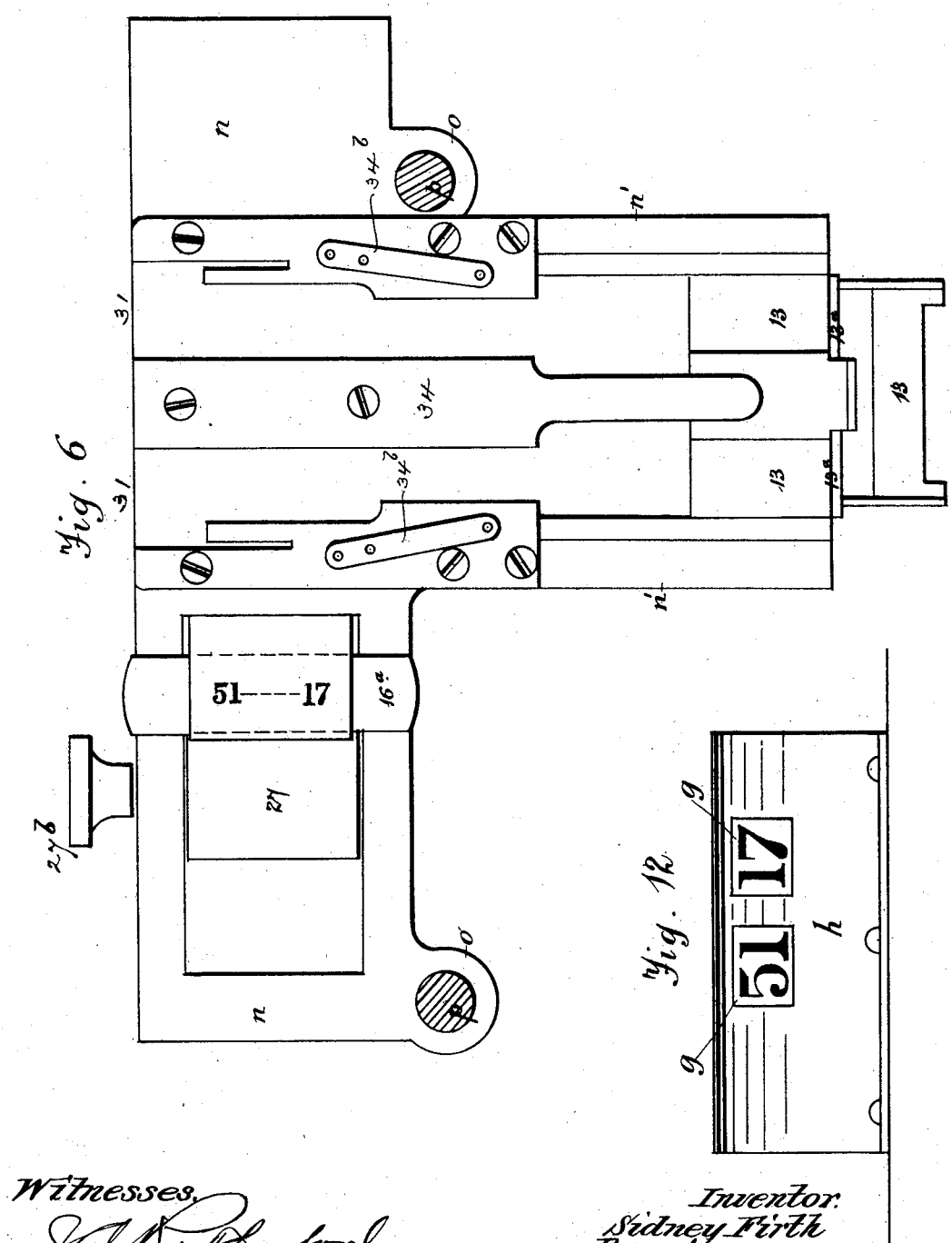

(No Model.) 7 Sheets—Sheet 6.
S. FIRTH.
APPARATUS FOR CHECKING AND RECORDING CASH RECEIVED.
No. 370,692. Patented Sept. 27, 1887.
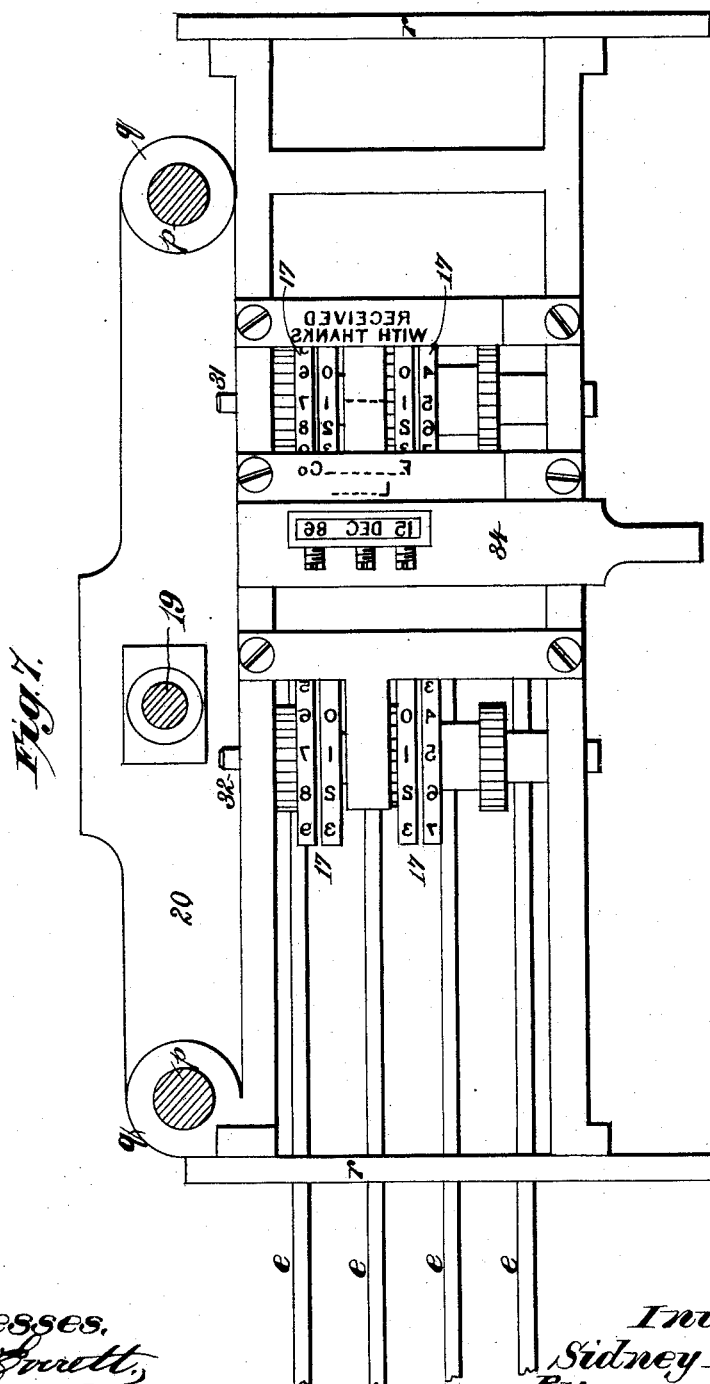
Witnesses.
Inventor.
Sidney Firth.
By James L. Norris.
Atty.

(No Model.) 7 Sheets—Sheet 7.
S. FIRTH.
APPARATUS FOR CHECKING AND RECORDING CASH RECEIVED.
No. 370,692. Patented Sept. 27, 1887.
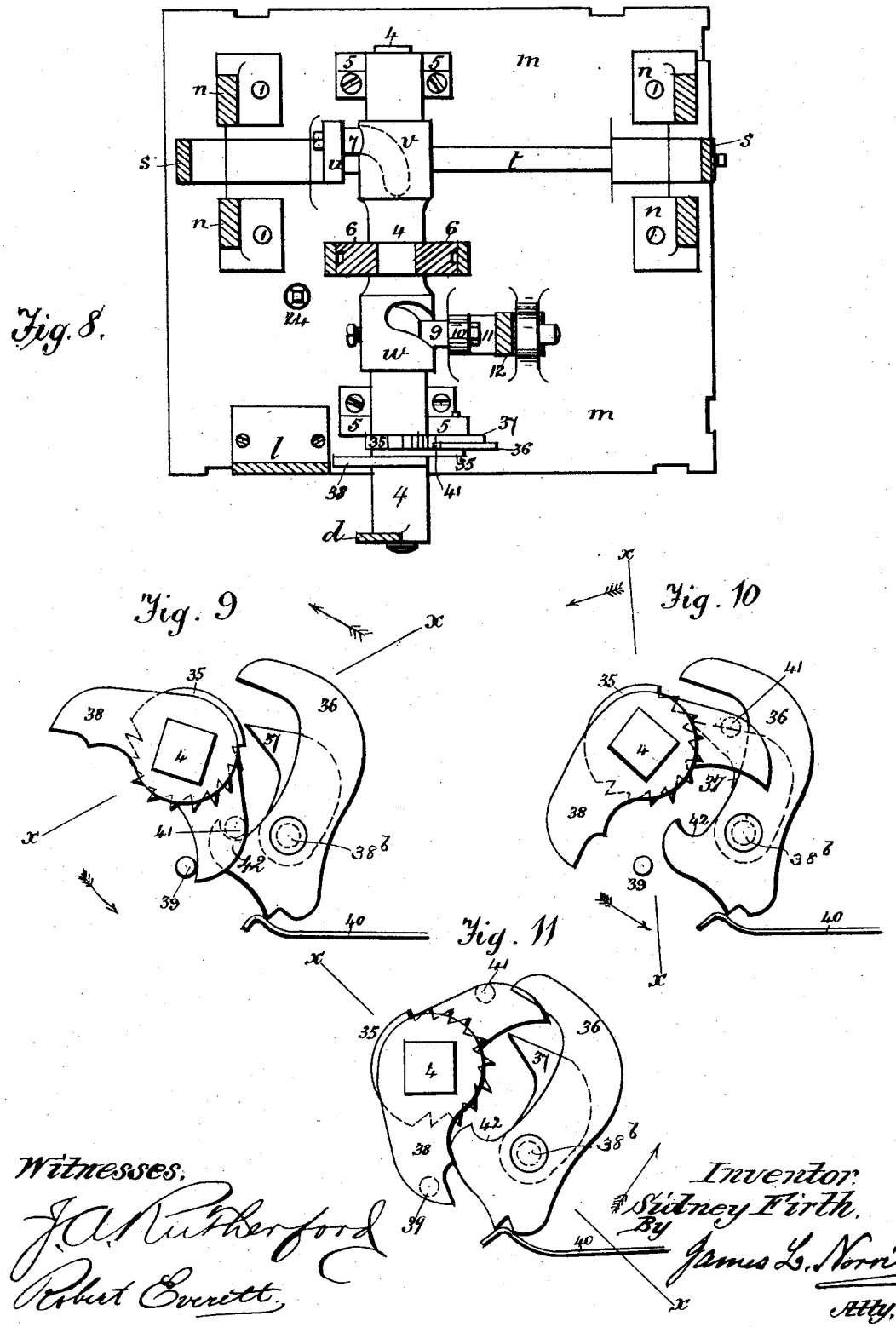
Witnesses:
J. A. Rutherford
Robert Everett
Inventor:
Sidney Firth
By James L. Norris
Atty.

UNITED STATES PATENT OFFICE.

SIDNEY FIRTH, OF LEEDS, COUNTY OF YORK, ENGLAND.

APPARATUS FOR CHECKING AND RECORDING CASH RECEIVED.

SPECIFICATION forming part of Letters Patent No. 370,692, dated September 27, 1887.

Application filed March 8, 1887. Serial No. 230,143. (No model.) Patented in England September 11, 1886, No. 11,585.

*To all whom it may concern:*

Be it known that I, SIDNEY FIRTH, a subject of the Queen of Great Britain, residing at 22 Royal Exchange, Leeds, in the county of York, England, engineer, have invented certain new and useful Improvements in Apparatus for Checking, Recording, and Indicating the Amounts of Cash Received, Taken, or Paid, such apparatus being also applicable to other analogous purposes, (for which I have obtained a patent in Great Britain, No. 11,585, bearing date September 11, 1886,) of which the following is a specification.

My invention consists of apparatus for indicating the date, the amount to be received, a magazine or reservoir for plain tickets, or tickets with blanks for the amounts and dates, a roll of paper mounted upon an axle, mechanism for printing the amounts indicated upon the tickets and upon the roll of paper simultaneously; also, for delivering such tickets (whether single or double) when printed and securing the printed portion of the roll of paper in a suitable receptacle inside the apparatus; also, for inking the type and operating the mechanism by hand or treadle, some portions of such mechanism being dispensed with when any one or more of the operations is or are not required.

In order that my said invention may be particularly described and ascertained, reference is hereby made to the accompanying drawings, in which similar letters and figures of reference indicate corresponding parts.

Figure 1 is a front elevation of the apparatus inclosed in a case. Fig. 2 is a back view of the same. Fig. 3 is a front elevation of the internal mechanism with the case removed. Fig. 4 is a back view of the same. Fig. 5 is an end view showing the index-wheels $f f$, adapted to dollars and cents. Fig. 5* shows the adaptation of the index-wheels to English money, and other obvious adaptations may be made to suit the coins of other nations. Fig. 6 is a plan on the line 6 6, Fig. 3. Fig. 7 is a view of the under side of the type-holder and press. Fig. 8 is a plan of the base-plate showing the axles and cams and some other attachments. Figs. 9, 10, and 11 are detail views of the lever-check for insuring the proper use of the lever $d$; and Fig. 12 is a side view of the semicircular cover $h$.

$a$ is the outer case. $b$ is a slot in the door $a'$ of the outer case, lined with brass or other metal, for the delivery of the tickets properly printed and dated, from which slot they are ejected by the mechanism hereinafter explained.

$c$ is a movable frame which serves as a magazine for holding a number of tickets, such tickets having blank spaces for the amounts of money and dates of delivery or other matter required to be printed or indicated upon the same by means of the internal mechanism.

$d$ is a handle for operating the machine, (which may be substituted by a treadle-action, if preferred,) and $e\ e\ e\ e$ are other handles (of which there may be any convenient number) for actuating the disks $f f$, (of which there may also be any convenient number.) These disks $f f$ have suitable numbers engraved or otherwise marked upon their peripheries, as shown in Fig. 5, one of which numbers on each disk can only be seen at one time through the openings $g g$ in the cover $h$, Fig. 12. The numbers visible through the openings $g$ are changed and otherwise controlled through the rotation of the disks by the handles $e\ e$. When the handles are down, the disks $f f$ present zero toward the openings $g$, and as the handles are lifted the numerals from 0 to 9, in some cases 0 to 11, are presented in succession, and may be seen through the openings. The printing apparatus prints, embosses, perforates, or otherwise impresses numbers or other matter corresponding to that which is visible on the disks. The openings in the outer case are secured by locks. The lock $i$ secures the door, which is used for gaining access to the internal record. The lock $l$ is used to secure the handle $d$ and prevent it being moved when the apparatus is not required to be used. This is shown locked in Fig. 4. Other locks are fitted, as required.

$m$ is the base-plate, to which the frame $n\ n$ is fixed by screws 1 1, the heads of which are under the plate, as shown in Fig. 8. Bosses $o\ o$ are cast on the frame $n$, in or to which the vertical guide-rods $p\ p$ are fixed. These rods $p\ p$ act as vertical guides to the bosses $q\ q$ of the press, which are bored to fit the rods $p\ p$ and preserve the parallelism of the press as it rises and falls. The upper part of the frame $n$ forms an entablature, as shown in Fig. 6, having the projecting frame n', Fig. 5, which supports the magazine c c and ejecting mechanism.

k, Figs. 3 and 4, is the inking-roller, which is carried to and fro upon its axles k' in the slotted guides r r, secured to the upper frame or press. The inking-roller k receives its vertical reciprocating motion by being secured in the slotted guides r r, and the to-and-fro motions are imparted thereto by the levers s s. These levers are fitted to the axle t, which is actuated by the crank u and cam v, Figs. 3 and 8.

The handles e e e e are fixed to the toothed wheels 2 2 2 2, and when the handles are lifted the wheels 2 2 rotate therewith to the same extent. The wheels 2 2 are in gear with pinions 3 3, which actuate the wheels f f, and also with wheels 17, Fig. 7, mounted on centers 18, having numbers on their peripheries, as shown in Fig. 7. The wheels 2 and pinions 3 are mounted on centers $18^a$ and $18^b$, respectively, as shown in Fig. 3.

The handle d is fittted to the axle 4, working in the bearings 5. The axle 4 is fitted with the cams v and w and eccentric 6, Figs. 3, 4, 5, and 8. The cam v actuates the crank u by means of the pin 7, and the crank u actuates the axle t and the levers s s. These levers carry the inking-roller k to the inking-pad 8, Fig. 3, by its forward movement. The reverse movement of the levers s s carries the inking-roller backward, passing under the inverted type, and at the same time inking the same. The inking-roller k is then carried to the back, as shown by dotted lines in Fig. 5. The cam w actuates the crank 10, Fig. 8, by means of the pin 9, fitted to the short axle 11, and carrying the vertical lever 12, the construction and arrangement of the cam w, pin 9, crank 10, and shaft 11 being similar to that of the cam v, pin 7, crank u, and axle t for actuating the levers s s, as shown in Fig. 3, except that the axle 11 is shorter than the axle t. The lever 12 is carried forward by one motion of the cam w and backward by the opposite motion. The upper end of the lever 12 is fitted to the under side of the ejector-slide 13.

14 is a roll of narrow paper working loosely on the spindle 15. Tension on this roll is furnished by a flat or spiral spring pressing the roll against the milled head on the spindle 15. The spindle 15 is tightened by the screw and lever 16. One end of this coil of paper is carried over the plate $16^a$, where it receives a print or impression from the wheels 17 immediately over such plate.

The handle d is at rest in the position shown in Figs. 1, 2, and 4, and to operate the apparatus it is partially rotated with the axle 4 to the left, as indicated by the arrows in Figs. 9, 10, and 11, (in which figures x x indicate the direction of the handle.) Fig. 9 shows the normal position. Fig. 10 shows an intermediate position, and Fig. 11 shows its extreme position ready for the return-stroke. When the lever d is in the position shown in Fig. 4, the eccentric 6 is raised to its upper position, the eccentric-rod 19 has lifted the printing-press 20, and the screw-pin 21 on the eccentric 6 has lifted the lever 22. This lever carries the pawl-rod 23, the lower end of which has a spring, 24, as shown. The check-pawl 25 prevents the ratchet-wheel 26 from rotating in a backward direction. When the handle d is turned to the left, the eccentric 6 falls, carrying down the pin 21, lever 22, and rod 23, the wheel 26 remaining stationary. On the return-stroke the lever 22 and pawl-bar 23 rise and cause the wheel 26 to rotate a certain distance. This wheel moves the drum 27 and follower-drum 28, whereby the paper or ribbon 29 is drawn into the receptacle formed by the plate 30 for receiving the internal record of the amounts taken. This receptacle is only accessible by means of the door a'.

In order to adjust the paper strip or ribbon between the drums 27 and 28, one of said drums, as 27, may be provided with a thumb-button, $27^b$, by which it can be rotated by hand.

The upward motion of the press 20 is effected by the return of the handle d to its normal position, and the downward motion by the handle being turned to the left. When in the position shown in Fig. 11, the pressure is applied and the printing of the cards, tickets, or invoices under the form 31, Fig. 7, and of the paper under the form 32, is effected. Springs 33 are fitted which enter between the teeth of the wheels 2 2 and supply sufficient friction to prevent involuntary motion of the wheels.

34 is a movable dating-plate for altering the date. This plate is made to slide in and out by hand, and retains its place by friction or otherwise—as by means of pivoted clamps $34^b$, Fig. 6.

The tickets, which are placed in the reservoir or magazine c, successively fall upon the ejector-slide 13. This slide carries a raised lip at $13^a$, Fig. 6, of just sufficient height to seize one of the tickets and carry it forward to a position under the printing form and type 31, and from which latter position it is ejected through the port b.

Figs. 9, 10, and 11 are intended to explain the action of the ratchet 35 and pawls 36, 37, and 38, the pawls 36 and 37 being rigidly joined together and pivoted on a stud, $38^b$, supported by one of the bearings 5. In Fig. 9 this mechanism is shown in the same position as in Fig. 4, in which one arm of the pawl 38 rests against the pin 39 on one of the bearings of the axle 4. The horizontal arm of the pawl 38 is capable of being locked by the bolt of the lock l, as shown in Fig. 4. When unlocked and turned to the position shown in Fig. 10, the pawl 37 enters between the teeth of the ratchet 35 and prevents its return. The spring 40 presses the pawls 36 37 toward the ratchet. One arm of the pawl 38 carries a pin, 41, which lifts the pawl 36 just before it arrives at the position shown in Fig. 11. This throws the pawl 37 out of gear, in which position the spring 40 retains the same, and thus allows the return-stroke of the handle d, axle 4, and ratchet 35. When the pin 41 is brought down to the arm 42 of the pawl 36, the position of the pawl 36 with respect to the spring 40 is restored to the position shown in Fig. 9, ready for the next series of operations. It will thus be seen that on starting the handle d from its normal position the operation must be completed, this being necessary to prevent damage to the mechanism.

My invention may be modified by dispensing with the reservoir for tickets c c and passing the ticket or invoice by hand into the port b, withdrawing the same when printed, the ejector-slide and its appendages being in that case unnecessary.

It is obvious that instead of placing the press above to travel upon the upper ends of the guide-rods p p, the same may be placed lower down and carry the type upward against fixed plates above the same; also, the indications and records may be performed by dry-pressure or by perforating mechanism, in which case the inking-roller k, pad 8, and other appliances connected with the same, may be dispensed with.

I claim—

1. The combination, with a printing mechanism and the plate $16^a$, of the spindle 15, carrying a roll or ribbon of paper, the axle 4, having an operating-handle, d, the eccentric 6, mounted on said axle and provided with pin 21, the lever 22, pivoted pawl-rod 23, spring 24, the feed-drums 27 and 28, the ratchet 26, connected with one of said drums, and the check-pawl 25, substantially as shown and described.

2. The combination of a printing mechanism, a magazine, c, for holding tickets, the axle 4, the cam w, mounted on said axle, the short axle 11, having a crank, 10, provided with a pin, 9, that engages said cam, the lever 12, mounted on the axle 11, and the ejector 13, carried by said lever, substantially as shown and described.

3. The combination of a printing mechanism, the inking-pad 8, the inking-roller k, slotted guides r r, levers s s, carrying the inking-roller, the axle t, carrying said levers, the cam w, mounted on the axle t, the axle 4, having a cam, v, and handle d, and the pin 7, connecting the cams w and v, substantially as shown and described.

4. The combination, with the cam-axle 4, having an operating-handle, d, of the ratchet 35, pawls 36, 37, and 38, pins 39 41, springs 40, and lock l, substantially as shown and described.

5. The combination of the frame n, having bosses o o, the press 20, having bosses q q, the guide-rods p p, the axle 4, having handle d and eccentric 6, and the eccentric-rod 19, substantially as shown and described.

SIDNEY FIRTH.

Witnesses:
EDWD. WHITELEY,
JOSH. HY. WHITAKER.